United States Patent [19]
Baxter

[11] 3,970,175
[45] July 20, 1976

[54] SUPPORT FOR AN ACTUATING ARM OF A CONTROL ELEMENT OF A SPRING CLUTCH

[75] Inventor: Donald J. Baxter, South Euclid, Ohio

[73] Assignee: Marquette Metal Products Company, Cleveland, Ohio

[22] Filed: Sept. 2, 1975

[21] Appl. No.: 609,689

[52] U.S. Cl. .................................... 192/22; 192/26; 74/577 R; 188/82.7; 403/382; 403/397
[51] Int. Cl.² .......................................... F16D 11/02
[58] Field of Search ............... 192/26, 12 BA, 17 D, 192/33 C, 81 R, 81 C, 22, 28, 99 A, 99 R; 188/82.7; 74/577 R, 577 S, 522.5; 403/382, 397

[56] References Cited
UNITED STATES PATENTS

| | | | |
|---|---|---|---|
| 2,895,581 | 7/1959 | Lysett | 192/99 A |
| 2,938,223 | 5/1960 | Horowitz | 403/382 |
| 3,106,849 | 10/1963 | Valleau | 74/577 |
| 3,137,176 | 6/1964 | Wright | 74/577 |
| 3,258,095 | 6/1966 | Shelton | 192/26 |

Primary Examiner—Benjamin W. Wyche
Attorney, Agent, or Firm—Arthur Frederick; Victor D. Behn

[57] ABSTRACT

The invention relates to a support means for an actuating arm which is pivotally movable into and out of engagement with a stop element of a spring control element of a spring clutch. The support means includes a frame having a suitable opening for slidably receiving the actuating arm and a retaining member resiliently gripping the frame to retain the actuating arm in the opening in the frame.

7 Claims, 6 Drawing Figures

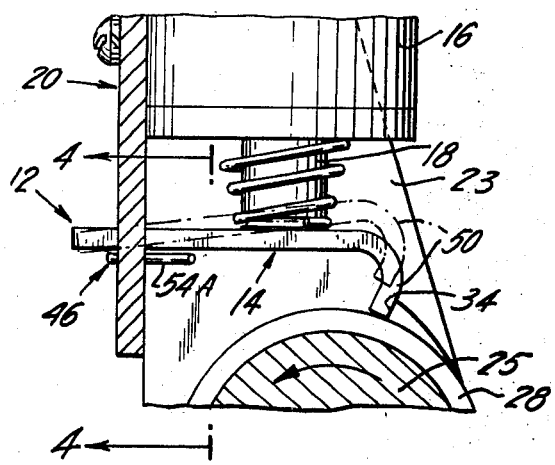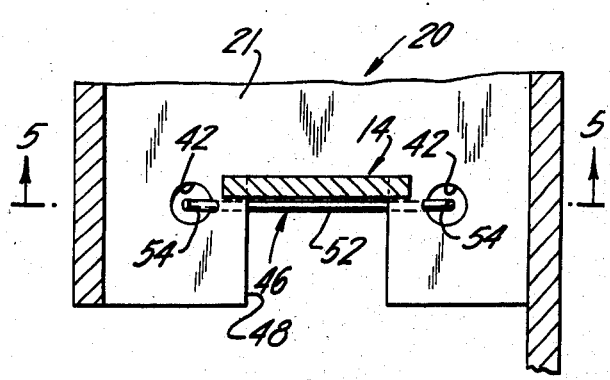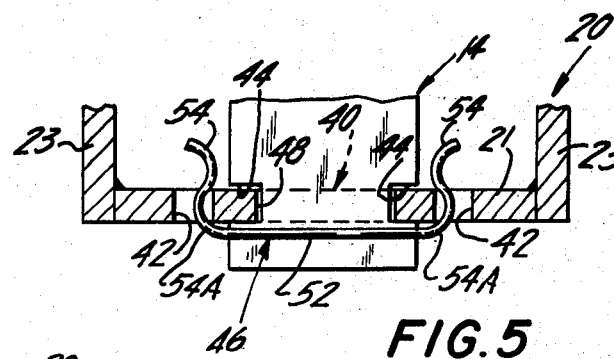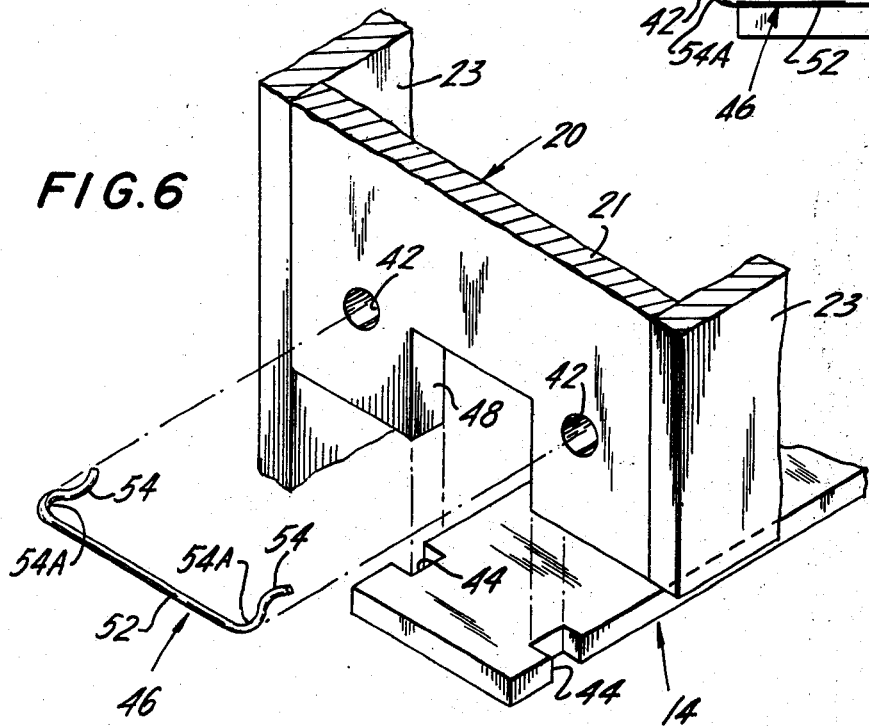

SUPPORT FOR AN ACTUATING ARM OF A CONTROL ELEMENT OF A SPRING CLUTCH

This invention relates to a support means for an actuating arm which functions to control the rotation of a spring control element of a spring clutch and, more specifically, to a support means for a pivotal actuating arm operative to engage and disengage from the spring clutch control element.

BACKGROUND OF THE INVENTION

Heretofore, in spring clutches having a rotatable control element, such as a sleeve or disc, for controlling engagement and disengagement of a helical spring with the input and output drums, an actuating arm was supported for pivotal movement into and out of engagement with the control element by relatively expensive and complex means. For example, one typical support means for the actuating arm comprised spaced ears or flanges on a frame for receiving therebetween the actuating arm and a pivot pin extending through aligned holes in the ears and arm, the pin being secured in place by one or two split rings or washers. This typical support means also made assembly and disassembly relatively difficult and time consuming.

Accordingly, it is an object of this invention to provide a support means for supporting an actuating arm for movement into and out of engagement with a control element of a spring clutch, which support means is relatively simple, inexpensive and can be quickly and easily assembled and disassembled.

SUMMARY OF INVENTION

The invention, therefore, contemplates a support means for an actuating arm which is movable into and out of engagement with a control element, such as a control sleeve or disc, of a spring clutch mechanism as exemplified in the U.S. patents to Marihart, No. 2,475,432; Hungerford et al., No. 2,951,568; Sacchini et al., No. 2,968,380; Kunde et al., No. 3,181,669. The support means comprises a frame having a first opening and a pair of second openings adjacent the first opening. The first opening is formed and dimensioned so as to slidably receive the actuating arm. A retaining member is disposed to span the first opening and to be receivable in the second openings to thereby engage and retain the actuating arm in the first opening.

Preferably the retaining member is resilient and deformable for insertion in the second opening and self-retentive therein, and deformable for release and removal from the second openings.

In a narrower aspect of the invention the first opening is a vertically extending, straight sided notch in the frame while the actuating arm has juxtaposed grooves adjacent one end thereof, each of the grooves being sized to receive therein the frame adjacent each of the straight sides of the notch and thereby limit axial movement and allow sufficient pivotal movement of the actuating arm relative to the frame to effect engagement and disengagement of the control element.

BRIEF DESCRIPTION OF DRAWINGS

The invention will be more fully understood from the following description when considered in connection with the accompanying drawings in which:

FIG. 3 is a cross-sectional view taken substantially along line 3—3 of FIG. 2, on an enlarged scale;

FIG. 4 is a view in cross-section taken substantially along line 4—4 of FIG. 3;

FIG. 5 is a cross-sectional view taken substantially along line 5—5 of FIG. 4; and FIG. 6 is an exploded view in perspective of the support means according to this invention.

DESCRIPTION OF THE PREFERRED EMBODIMENT

Figure 1:
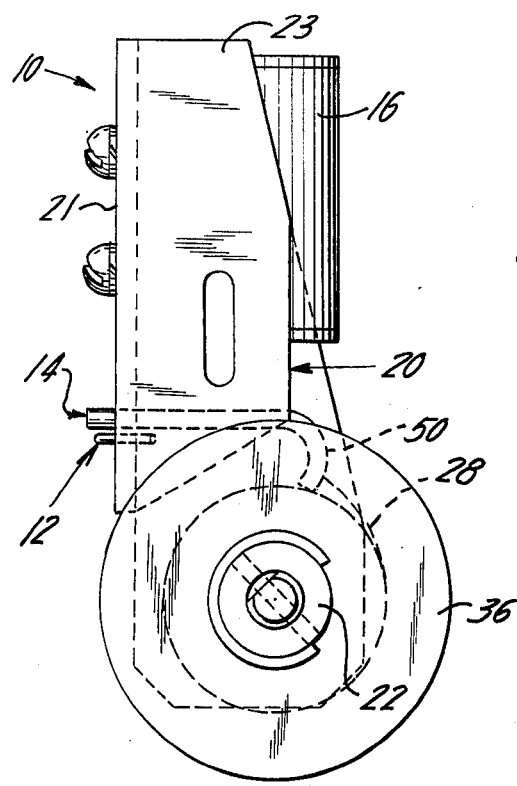
FIG. 1 is a front elevational view of an electro-magnetic spring clutch mechanism having an actuating arm support means in accordance with the present invention.
Figure 2:
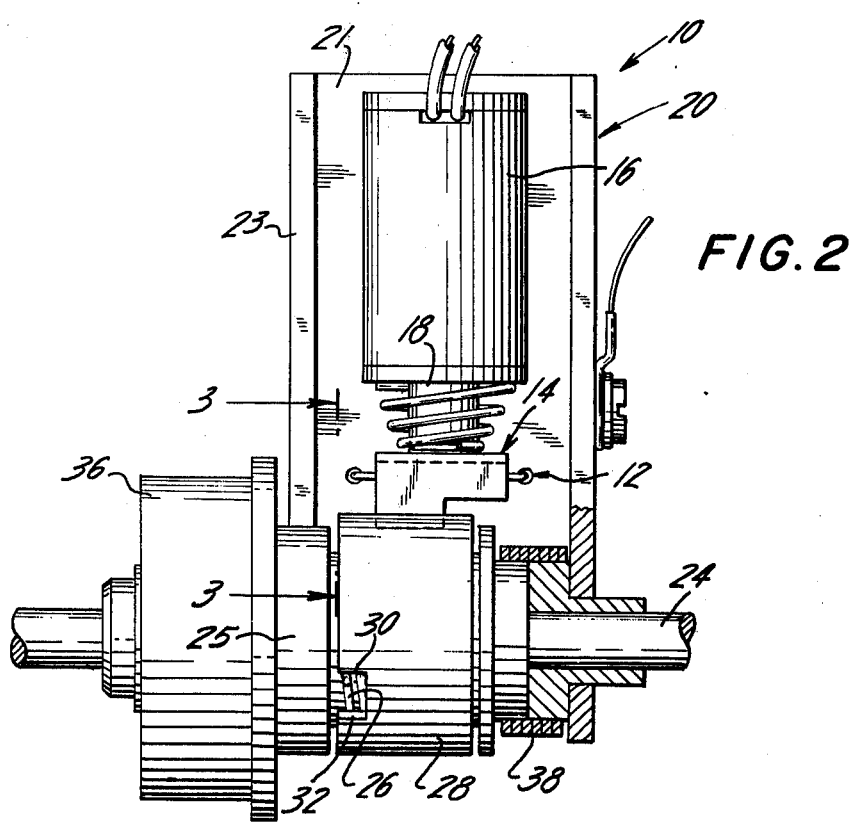
FIG. 2 is a side elevational view of the spring clutch mechanism shown in FIG. 1.

Now referring to the drawings and more specifically FIGS. 1 and 2, the reference number 10 generaly designates a spring clutch mechanism which may, as shown, be of the electro-magnetic type and having a support means 12 according to this invention for supporting for pivotal movement an actuating lever or arm 14. While spring clutch mechanism 10 is shown and will be described as having a solenoid 16, the core 18 of which functions to effect movement of actuating arm 14, it is to be understood that the invention is not limited thereto and that any suitable means may be provided to effect movement of actuating arm 14 without departing from the scope and spirit of this invention.

As is shown in FIGS. 1 and 2, spring clutch mechanism 10 comprises a U-shaped frame 20 having a base portion 21 and spaced leg portions 23 in which are journaled an input shaft 22 and an output shaft 24. Torque is transmitted from input shaft 22 to output shaft 24 via a helical spring 26 which surrounds an input drum 25 and an output drum 27, the drums respectively being connected to input shaft 22 and output shaft 24. A control element in the form of a sleeve 28 surrounds spring 26 (see FIG. 2) and is connected to the spring in a suitable manner, such as by an interference fit or, as shown, by a toe 30 of spring 26 extending into a notch or slot 32 in sleeve 28. The sleeve 28 has a stop element in the form of an upstanding shoulder 34 which is constructed and arranged to abut one end 50 of actuating arm 14. The input shaft 22 is rotated from a suitable source of rotary power by a belt pulley 36 or other suitable means such as gears and sprockets. A no-back spring 38 may also comprise part of spring clutch mechanism 10.

In operation, assuming spring clutch mechanism 10 is a normally engaged clutch, rotation of input drum 25, via pulley 36 and input shaft 22, effects rotation of spring 26 which, in turn, rotates output drum (not shown) and output shaft 24. Since control sleeve 28 and spring 26 are interconnected by the toe 30 and slot 32, control sleeve 28 is rotated and, by arresting its rotation, spring 28 is caused to unwrap from input drum 25 and thus terminate torque transmission. Obviously, without departure from the scope and spirit of this invention, spring clutch mechanism 10 may be suitably modified so that arrest of rotation of control sleeve 28 would provide for transmission of torque rather than termination of such transmission. To control rotation of control sleeve 28, actuating arm 14 is supported for movement into and out of abutment with shoulder 34 by support means 12 according to this invention.

As best shown in FIGS. 3 to 6, support means 12 briefly comprises a slotted opening 40 in frame 20, a pair of second openings 42 in frame 20 straddling slotted opening 40, juxtaposed notches 44 in opposite sides of actuating arm 14, and a retaining member 46 insertable in second openings 42 to retain actuating arm 14 in slotted opening 40.

The slotted opening 40 extends, as illustrated, vertically from one edge of base portion 21 of frame 20 and has straight, parallel, vertical sides 48.

The actuating arm 14, as shown, may be an elongated member substantially rectangular in cross-section and having a pendant end portion 50 which is adapted to engage shoulder 34 of control sleeve 28. The juxtaposed notches 44 are disposed in close spaced relation to the end opposite pendant end portion 50. Each of the notches 44 are dimensioned to loosely receive therein frame 20 adjacent sides 48 of slotted opening 40. The size of slots 44 is only sufficient to permit pivotal movement of actuating arm 14 relative to frame 20 and pendant portion 50 to clear the path of travel (indicated by the arrow in FIG. 3) of shoulder 34 of control sleeve 28 as shown in broken lines in FIG. 3.

The retaining member 46 is a wire element preferably made of resilient material, such as springsteel or the like, and having a straight central portion 52 and S-shaped opposite end portions 54. The retaining member 46 is dimensioned so as to be insertable in second springs 42 by deformation (spreading of S-shaped end portions 54 away from each other). The curves 54A of S-shaped end portions 54 have a radius of such size that, upon release after deformation, each curve 54A embraces and grips frame 20 within its associated second opening 42 (see FIG. 5). With retaining member 46 inserted in second openings 42 and central portion 52 extending below and across actuating arm 14, actuating arm 14 is held witin slotted opening 40.

In assembly, actuating arm 14 is slid into slotted opening 40 by aligning notches 44 with sides 48 of the slotted opening. After actuating arm 14 abuts the end of slotted opening 40, retaining member 46 is inserted into second openings 42 by spreading or forcing end portions 54 into the second openings. With the retaining member 46 snapped into second openings 42 and gripping frame 20, actuating arm 14 is prevented from disengaging from slotted opening 40, but is free to engage in limited pivotal movement.

Disassembly is achieved quickly and easily merely by forcefully pulling retaining member 46 from openings 42 which spreads apart end portions 54, and thereafter sliding actuating arm 14 from slotted opening 40.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. In combination with an actuating arm movable into and out of engagement with a control spring element of a spring clutch mechanism, a support means for said actuating arm which comprises:
    a. a frame having a first opening second openings adjacent to and on opposite sides of said first opening;
    b. said actuating arm being slidably receivable in said first opening in the frame; and
    c. a retaining member spanning said first opening and slidably receivable in said second openings to grip the frame and thereby engage and retain said actuating arm in said first opening.

2. The combination of claim 1 wherein said retaining member is resilient and deformable for slidable insertion in said second openings and for gripping the frame adjacent said second openings.

3. The combination of claim 1 wherein said frame and said actuating arm coact to limit longitudinal linear movement of the actuating arm relative to said frame and allow pivotal movement to effect engagement and disengagement with said control spring element.

4. The combination of claim 3 wherein said coaction between the frame and said actuating arm is by means of a tongue and groove connection.

5. The combination of claim 4 wherein said tongue and groove connection comprises juxtaposed grooves in opposite sides of the actuating arm each of which grooves are dimensional to receive therein the frame adjacent each side of said opening in said frame.

6. The combination of claim 1 wherein said resilient retaining member is a U-shaped wire.

7. The combination of claim 1 wherein said first opening is a vertical straight sided notch in said frame and said actuating arm has juxtaposed grooves adjacent one end thereof, each of which grooves are sized to receive therein the frame adjacent each of the straight sides of the notch, and thereby limit axial movement and allow sufficient pivotal movement of said actuating arm relative to the frame to effect engagement and disengagement of said control element, and further wherein said resilient retaining member is a U-shaped wire extending to prevent movement of said actuating arm out of said notch.

* * * * *